E. M. HUGENTOBLER.
Mining and Excavating Apparatus.
No. 228,356. Patented June 1, 1880.
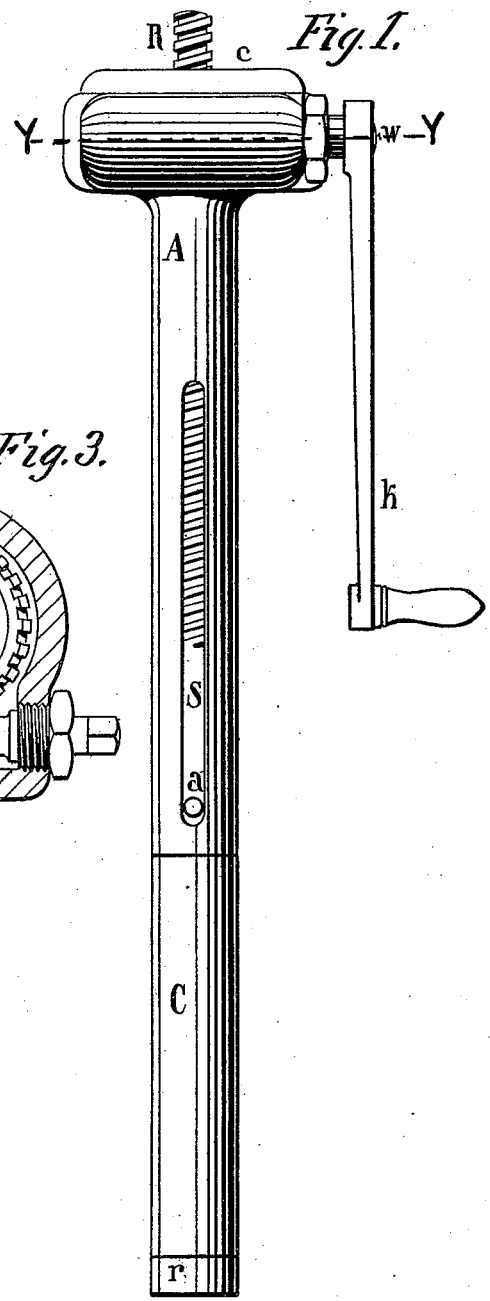
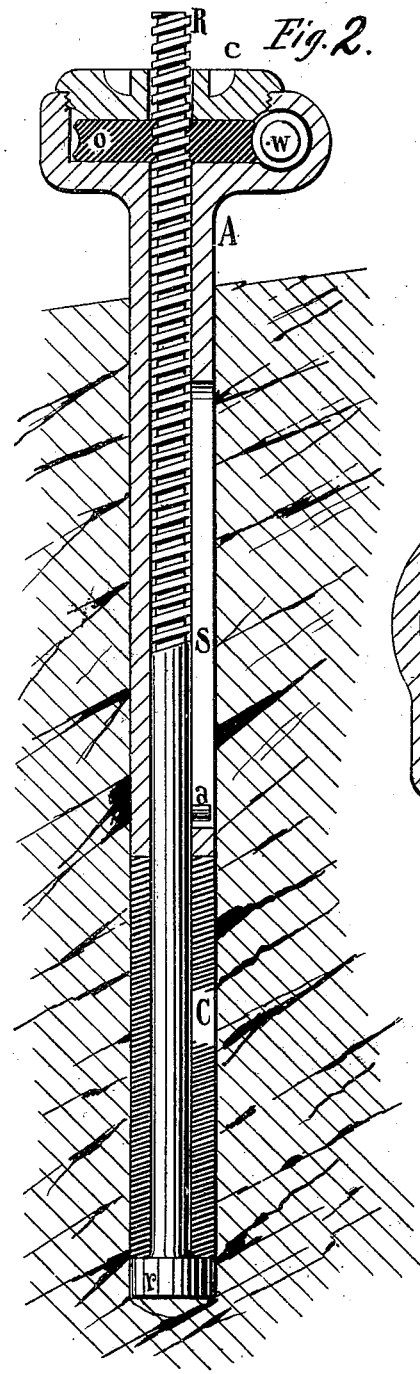
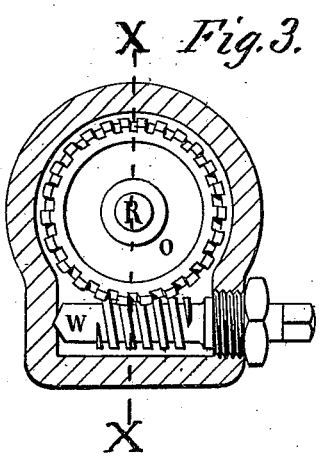
Witnesses:
S. G. Evans.
J. M. C. Cedham
Inventor:
E. M. Hugentobler

United States Patent Office.

EMIL M. HUGENTOBLER, OF PHILADELPHIA, PENNSYLVANIA, ASSIGNOR, BY MESNE ASSIGNMENTS, OF A PART OF HIS RIGHT TO ALEXANDER HAZARD AND JEROME BRADLEY, OF SAME PLACE, AND GEORGE W. DYER, OF WASHINGTON, DISTRICT OF COLUMBIA.

MINING AND EXCAVATING APPARATUS.

SPECIFICATION forming part of Letters Patent No. 228,356, dated June 1, 1880.

Application filed September 26, 1878.

*To all whom it may concern:*

Be it known that I, EMIL M. HUGENTOBLER, of the city and county of Philadelphia, in the State of Pennsylvania, have invented a new and useful Mining and Excavating Apparatus, of which the following is a complete description, reference being had to the accompanying drawings, forming part of this specification.

My invention consists in using, instead of powder, a mechanical bursting effort in an ordinary blast-hole.

In cases where a scattering effect is desired in blasting, detonating substances are used in preference to explosives; but there are cases—such, for instance, as coal-mining and stone-cutting for building purposes—where the effect of explosives is more scattering than is necessary, or even where explosives cannot be used at all; and it is in such cases that I propose to substitute a mechanical action for that of the explosive.

The invention is especially valuable for coal-mining, the use of powder being dangerous, slow, and reducing a large percentage of the coal to culm.

The apparatus which I have invented to accomplish the above result is shown in the accompanying drawings.

Figure 1 is an elevation. Fig. 2 is a longitudinal section through line $x\, x$, marked on Fig. 3. Fig. 3 is a horizontal section through line $y\, y$, marked on Fig. 1.

A is a cast-iron casing provided with a long sleeve. This sleeve is of the same outside diameter as the blast-hole. Through the sleeve runs an iron or steel rod, R, having a head, $r$, forged on its lower end, of the same diameter as the blast-hole. The other end of the rod is threaded.

To prevent rod R from revolving inside of the sleeve of casing A a stud, $a$, is pinned on the rod R and works in the longitudinal slot S in casing A.

Rod R is engaged with the nut O, which is inclosed in casing A. Said nut O has a toothed periphery gearing with endless screw W. Screw W works on suitable bearings secured on the sides of casing A.

A cap, $c$, closes the casing A to hold the nut-wheel O and rod R in position.

A sleeve, C, of rubber, having an inner diameter equal to that of rod R and an outer diameter equal to that of the blast-hole, is slipped over rod R before putting the machine together, and by screwing up nut O the rubber C is made to bear, as shown in drawings, both on head $r$ and the sleeve of the casing A. Thus the sleeve, the rubber sleeve C, and the head $r$ present the appearance of one continuous cylinder of the same diameter as the blast-hole.

The apparatus thus connected is ready to work, and is slipped into the blast-hole, as shown in Fig. 2.

The operation of the apparatus is based on the fact that rubber, although it will admit of almost any change in shape, will not change in bulk, and also on the fact that, if rubber be inclosed in a vessel and pressure exerted through a movable piston on one side of the rubber, this same pressure per square inch is transmitted by the rubber in all directions against the sides of the vessel. In other words, we may say that a pressure similar to a hydrostatic pressure is developed.

This being said, the operation of the machine may be readily understood.

By turning endless screw W the nut O is revolved and the casing A and head $r$ are drawn closer together. The rubber sleeve C is thereby shortened and its outside diameter increased, thus fitting tightly to the sides of the hole and securing the whole apparatus firmly in position. Then by further turning the endless screw W the pressure may be increased until a rupture of the coal (or other substance) is produced. When it is necessary to exert a great pressure and to use a long rubber it is preferable to use a set of short rubber sleeves separated by metallic washers. This will obviate a too heavy internal strain on the rubber.

The end of endless screw W is made square, so as to attach a wrench or crank, K. When the machine is to work deep into the hole, thus preventing the full circular swing of crank K, a pawl-wrench may be used to advantage.

When working in a substance which might bruise the rubber sleeve C it may be shielded by wrapping around it a sheet of tin or other metal.

The apparatus, owing to its compactness, may be used wherever a hole may be bored.

I do not claim as my discovery the application of the incompressibility of rubber to developing a pressure analogous to hydrostatic pressure in general; but What I do claim, and desire to secure by Letters Patent, is—

1. A longitudinally-compressible and laterally-expansible spring of rubber or its equivalent, in combination with a compressing apparatus, substantially as and for the purpose herein described.

2. The annular cylinder or cylinders of rubber or their equivalent, secured between and compressed by head $r$ on rod R and casing A, substantially as described.

3. The new mining and excavating apparatus, composed of rod R, with head $r$, casing A, wheel O, and worm-wheel W, connected as described, and operating a rubber sleeve or spring, C, or its equivalent, substantially as and for the purpose described.

E. M. HUGENTOBLER.

Witnesses:
S. LLOYD WIEGAND,
J. DANIEL EBY.